Patented Nov. 28, 1922.

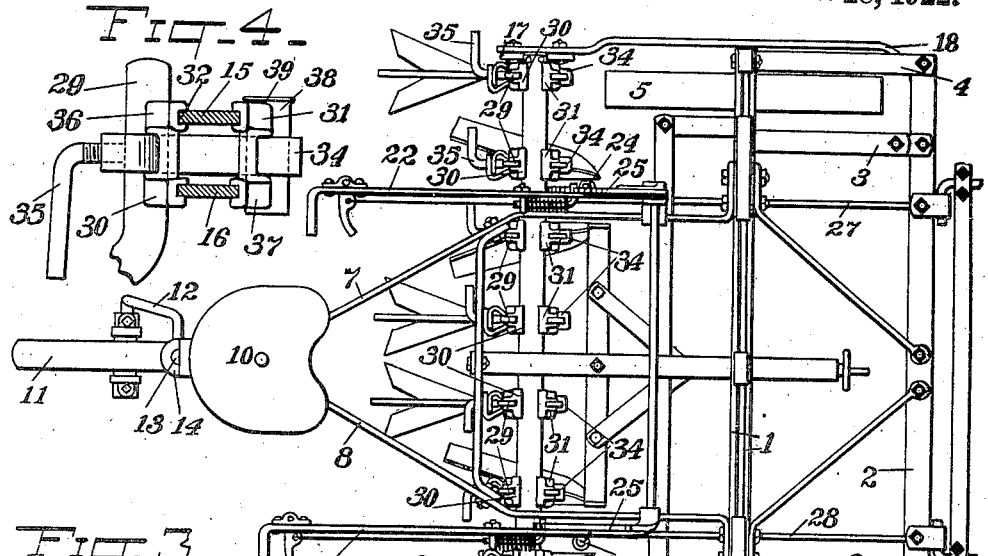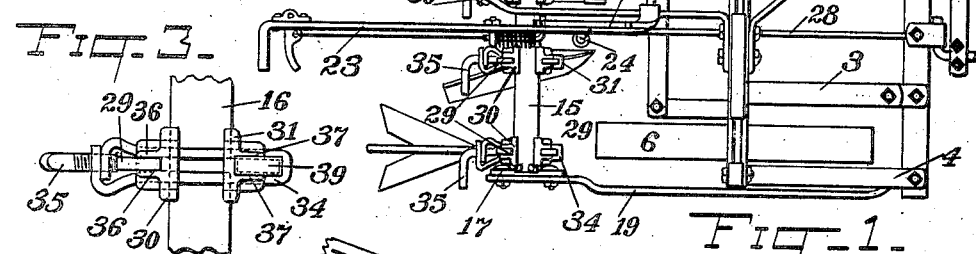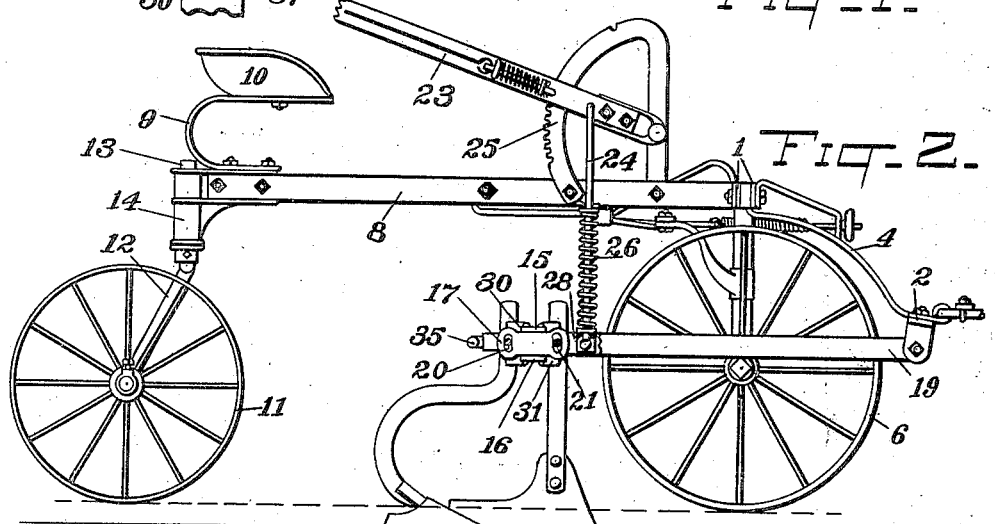

1,437,032

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

TOOL HOLDER FOR CULTIVATORS.

Application filed September 30, 1920. Serial No. 413,870.

*To all whom it may concern:*

Be it known that I, CHARLES H. WHITE, a citizen of the United States, residing at Moline, in the county of Rock Island and State of Illinois, have invented certain new and useful Improvements in Tool Holders for Cultivators, of which the following is a specification, reference being had therein to the accompanying drawing.

My invention relates to cultivators and similar earth stirring implements, and has for its object the production of a simple and effective means for securing the earth stirring tools to a cultivator, such means being readily adjustable to accommodate various conditions of cultivation and various types of tools, and in which the tools employed may be adjusted or readily inserted or removed.

Referring to the drawings in which similar numerals indicate identical parts—

Figure 1 is a plan view of a cultivator embodying my improvements.

Figure 2 is a side elevation of Figure 1.

Figure 3 is an enlarged top view of my device with one of the frame bars of the cultivator removed.

Figure 4 is a side view of my device and connected parts, and

Figure 5 is a front and rear view of one of the tool holding parts.

In the type of cultivator shown the main frame is composed of lateral bars 1 and 2 and longitudinal bars 3 and 4 rigidly secured together by suitable bolts, and is supported on ground wheels 5 and 6. Seat bars 7 and 8 are secured to the frame bars 1 and extend rearwardly, their rearward portions converging and forming a support for a seat spring 9 on which is mounted a seat 10. The rear ends of the seat bars 7 and 8 are supported by a caster wheel 11 on a crank axle 12 having a vertical spindle 13 journaled in a bearing 14 secured on the rear of the seat bars 7 and 8.

A tool carrying beam is composed preferably of flat bars 15 and 16 one above the other and parallel; the bars 15 and 16 are spaced apart and secured, at opposite ends, to rockable members 17. Pivotally supported on depending brackets on the bar 2 are bars 18 and 19 which extend rearwardly and on the rear of which the members 17 are secured by bolts which extend through slots 20 and 21 in the members 17. The slots 20 and 21 are for the purpose of rocking the tool carrying beam to swing the tools forward or back, for by loosening the bolts therein the beam can be rocked forwardly or rearwardly and secured in the position desired. The tool carrying beam is raised or lowered by operation of levers 22 and 23 pivotally supported on the seat bars 7 and 8 respectively. Each lever is connected to the tool carrying beam by a rod 24, and is provided with a notched sector 25, mounted on the seat bars, with which latches, of the usual type, on the levers are adapted to engage. Coiled springs 26 on the rods 24 operate with downward pressure on bars 27 and 28, the latter are parallel to the bars 18 and 19 and are similarly pivoted on the frame bar 2 and assist in supporting the tooth carrying beam to which they are connected.

As before stated various types of earth working tools may be utilized with my improved holder, any of which will include a shank 29. The tool holder comprises similar blocks or castings 30 and 31 provided with grooves 32 on their inner faces for reception of the edges of the bars 15 and 16. Each block has a central opening 33 through which I pass a clamping member 34 to extend beyond the block 31. The member 34 I make preferably of a flat bar bent upon itself to have parallel sides and the end portions bent to overlap and contact. The overlapping portions of the member 34 are perforated, the perforations being threaded to receive a hand screw 35. The shank 29 is inserted in the member 34 and between projecting parts 36 on the block 30, and between similar projecting parts 37 on the block 31, and in the bent loop of the member 34 is a filler block 38 which is provided with a flange 39 at its upper end to contact with the top of the block 31 to prevent the filler block from dropping out when the parts of the holder are loosened. When the parts of the holder are in place, as stated, the hand screw is operated to hold them firmly together, the screw operating against the shank and drawing the member against the filler block 38.

The holder can be moved longitudinally of the tool carrying beam by loosening the hand screw 35, and when the latter is loose the shank 29 can be removed and another substituted, or the filler block 38 may be substituted and the shank 29 be inserted in place of the filler block in the loop of the member 34 to bring the tool on the shank 29 farther forward; it is also apparent that the shank 29 can be moved vertically when necessary and that tools can be mounted alternately on the front and rear of the tool carrying beam.

What I claim is—

1. The combination with a cultivator frame, of tool carrying bars supported thereon in parallel relation and spaced apart one above the other, a tool holder mounted on said bars and comprising oppositely disposed castings adapted to be held in contact with adjacent edges of said bars, openings in said castings, a clamping member extending through said openings between the bars and projecting beyond said castings, a tool standard held within said member against the adjacent casting, a filler block held within the opposite end of said member against the adjacent casting, and means operable in contact with said standard to hold the standard and holder parts rigid with said bars.

2. The combination with a cultivator frame, of tool carrying bars supported thereon in parallel relation and spaced apart one above the other, a tool holder mounted on said bars and comprising oppositely disposed castings, grooves in the opposed faces of said castings in which the edges of said bars rest, openings in said castings, a clamping member extending through said openings between the bars and projecting beyond said castings, a tool standard held within said member against the adjacent casting, a filler block held within the opposite end of said member against the adjacent casting, and means operable in contact with said standard to hold the standard and holder parts rigid with said bars.

3. The combination with a cultivator frame, of tool carrying bars supported thereon in parallel relation and spaced apart one above the other, a tool holder mounted on said bars and comprising oppositely disposed castings, grooves in the opposed faces of said castings with which said bars engage, openings in said castings, a clamping member extending through said openings between the bars and projecting beyond said castings, a vertical groove in the outer face of each casting, a tool standard held within said member and the vertical groove of the adjacent casting, a filler block held within the opposite end of said member and in the vertical groove of the adjacent casting, and means operable in contact with said standard to hold the latter and holder parts rigid with said bars.

4. The combination with a cultivator frame, of tool carrying bars supported thereon in parallel relation and spaced apart one above the other, a tool holder mounted on said bars and comprising oppositely disposed castings, openings in said castings, a clamping member extending through said openings between the bars and projecting beyond said castings, a vertical groove in the outer face of each casting, a tool standard held within said member and the vertical groove of the adjacent casting, a filler block held within the opposite end of said member and in the vertical groove of the adjacent casting, and means operable to hold said standard and holder parts rigid with said bars.

CHARLES H. WHITE.